US011947289B2

(12) United States Patent
Lee et al.

(10) Patent No.: US 11,947,289 B2
(45) Date of Patent: Apr. 2, 2024

(54) JAM PREVENTION OF PRINTING MEDIA USING GAP ADJUSTING

(71) Applicant: HEWLETT-PACKARD DEVELOPMENT COMPANY, L.P., Spring, TX (US)

(72) Inventors: Jin Seok Lee, Seongnam-si (KR); Bong Hee Lee, Seongnam-si (KR); Jin Yoon Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/789,041

(22) PCT Filed: Dec. 30, 2020

(86) PCT No.: PCT/US2020/067426

§ 371 (c)(1),
(2) Date: Jun. 24, 2022

(87) PCT Pub. No.: WO2021/141810

PCT Pub. Date: Jul. 15, 2021

(65) Prior Publication Data

US 2023/0044328 A1 Feb. 9, 2023

(30) Foreign Application Priority Data

Jan. 6, 2020 (KR) ........................ 10-2020-0001239

(51) Int. Cl.
*G03G 15/20* (2006.01)

(52) U.S. Cl.
CPC ..... *G03G 15/2035* (2013.01); *G03G 15/2028* (2013.01)

(58) Field of Classification Search
CPC ........................ G03G 15/2035; G03G 15/2028
See application file for complete search history.

(56) References Cited

U.S. PATENT DOCUMENTS

| | | | |
|---|---|---|---|
| 5,623,720 A | 4/1997 | Howe et al. | |
| 5,865,432 A | 2/1999 | Lee | |
| 2004/0056086 A1 | 3/2004 | Mason et al. | |
| 2006/0220294 A1 | 10/2006 | Sye | |
| 2007/0035605 A1 | 2/2007 | Kitahara | |
| 2009/0123202 A1 | 5/2009 | Yoshinaga et al. | |
| 2012/0224893 A1 * | 9/2012 | Yamamoto ......... | G03G 15/2028 399/323 |

FOREIGN PATENT DOCUMENTS

| | | |
|---|---|---|
| EP | 1 785 781 B1 | 11/2018 |
| JP | 2003-323068 A | 11/2003 |
| KR | 10-2007-0041997 A | 4/2007 |
| KR | 10-2007-0067748 A | 6/2007 |

* cited by examiner

*Primary Examiner* — Victor Verbitsky
(74) *Attorney, Agent, or Firm* — Foley & Lardner LLP

(57) ABSTRACT

An example image forming apparatus includes a main body, a printing engine to be disposed in the main body to form an image on a printing medium, a fixing apparatus including a fixing roller and a fixing belt disposed to face the fixing roller, and a jam prevention apparatus including a fixed frame disposed adjacent to the fixing apparatus, and a movable apparatus to be detachably fastened to the fixed frame through a plurality of adjusting screws, to adjust a gap with the fixing belt according to a fastening direction of the plurality of adjusting screws.

15 Claims, 8 Drawing Sheets

JAM PREVENTION OF PRINTING MEDIA USING GAP ADJUSTING

BACKGROUND

In general, an image forming apparatus such as a copier, a printer, a scanner, or a facsimile using an electrophotographic method includes a fixing apparatus for fixing an unfixed image transferred to a printing medium to the printing medium by heating and pressing.

The unfixed image may be stably fixed to the printing medium as the unfixed image is heated and pressed, while the printing medium passes through a fixing nip formed between a fixing belt of the fixing apparatus and a pressure roller pressurized while being in contact with the fixing belt.

BRIEF DESCRIPTION OF THE DRAWINGS

Various examples will be described below by referring to the following figures.

DETAILED DESCRIPTION

Hereinafter, examples will be described with reference to the accompanying drawings. The examples described below may be modified and implemented in various different forms. In order to more clearly describe features of various examples, a detailed description of known matters to those skilled in the art may be omitted.

As used herein, when a component is referred to as being "connected to" another component, it means that the component and the other component may be 'directly connected to' each other or may be 'connected to' each other while having another component interposed therebetween'. In addition, when a component is referred to as "including" another component, it means that other components are not excluded but may be further included, unless explicitly described to the contrary.

As used herein, the term "image forming job" may refer to various jobs (e.g., copy, print, scan, or fax) related to an image, such as forming of an image or creating/storing/transmitting of an image file, and the term "job" may refer not only to the image forming job, but also to a series of processes necessary to perform the image forming job.

In addition, an image forming apparatus may refer to an apparatus for printing print data generated by a terminal device such as a computer onto a printing medium. Examples of such an image forming apparatus may include a copier, a printer, a scanner, a facsimile, or a multi-function printer (MFP) that complexly implements the functions of the copier, the printer, the scanner, and the facsimile through a single device.

Figure 1:
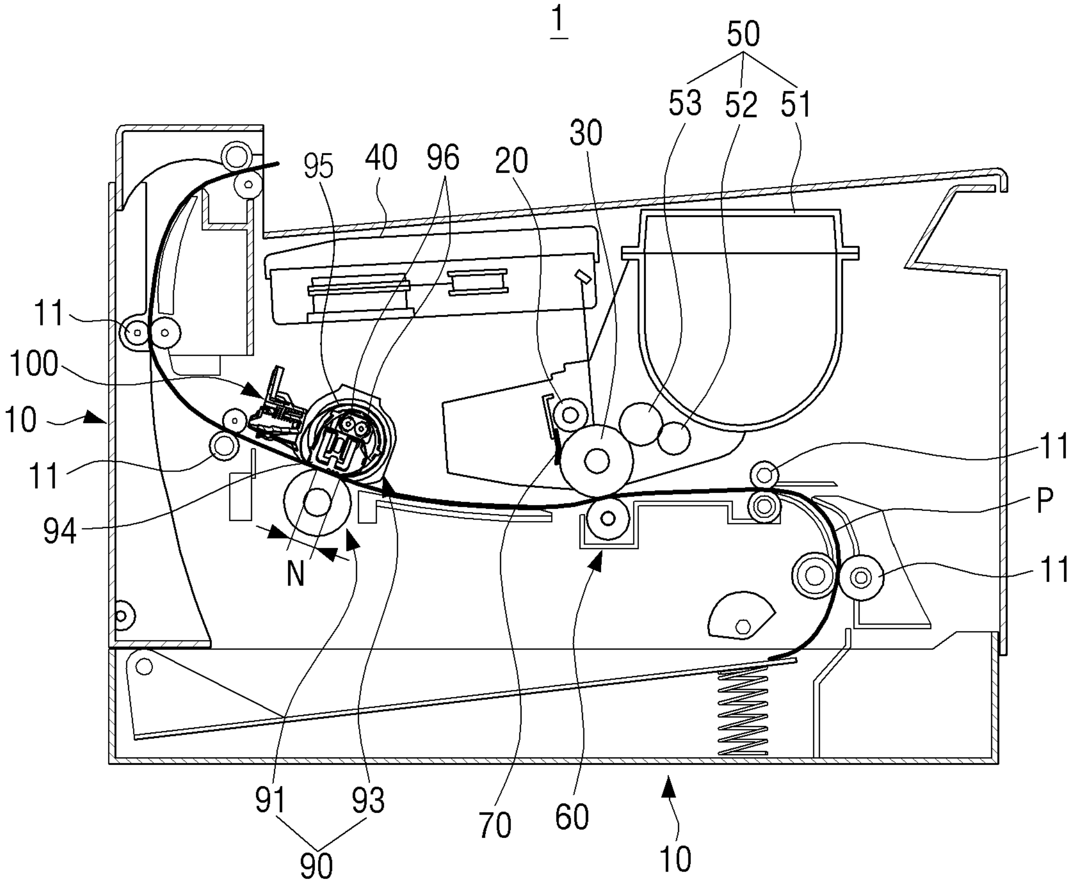
FIG. 1 is a schematic view illustrating an image forming apparatus including a jam prevention apparatus according to an example.

FIG. 1 is a schematic view illustrating an image forming apparatus including a jam prevention apparatus according to an example.

Referring to FIG. 1, a thick solid line indicated by reference numeral P indicates a traveling path of a print medium.

A paper feeding apparatus 10 of an image forming apparatus 1 may store a printing medium such as paper. The printing medium is conveyed along a traveling path P by a plurality of conveying rollers 11. A charging apparatus 20 may charge a photosensitive member 30 to a predetermined potential. An optical scanning apparatus 40 may scan light onto the photosensitive member 30 to form an electrostatic latent image corresponding to print data on the photosensitive member 30.

A developing apparatus 50 may supply toner to the photosensitive member 30 on which the electrostatic latent image is formed, thereby forming a toner image. The developing apparatus 50 may include a toner accommodating portion 51, a toner supply roller 52, and a developing roller 53.

The toner accommodating portion 51 accommodates toner therein. The toner supply roller 52 supplies toner accommodated in the toner accommodating portion 51 to the developing roller 53, whereby a toner layer is formed on the developing roller 53. A regulating blade (not illustrated) is provided to make the toner layer uniform. The toner layer on the developing roller 53 moves to the electrostatic latent image formed on the photosensitive member 30 due to a potential difference to develop the toner image.

A transfer apparatus 60 may transfer the toner image formed on the photosensitive member 30 to the print medium. A cleaning apparatus 70 may remove toner remaining on the photosensitive member 30 after the transfer process is performed.

A fixing apparatus 90 may fix the toner image transferred to the printing medium. The printing medium on which the toner image is fixed is discharged out of the image forming apparatus 1 by the plurality of conveying rollers 11, thereby completing a printing process.

The fixing apparatus 90 may include a pressing roller 91 and a heating apparatus 93. In a section where the pressing roller 91 and the heating apparatus 93 contact each other, a fixing nip N is formed. In an example, the fixing nip N may be formed long in a length direction. The fixing nip N may be formed to be equal to or larger than a width of the printing medium. On the printing medium passing through the transfer apparatus 60, there is unfixed toner which forms the toner image. As heat and pressure are applied to the printing medium while the printing medium passes through the fixing nip N, the unfixed toner on the printing medium may be fixed.

The pressing roller 91 may be formed of an elastic material such as rubber, sponge, etc. The pressing roller 91 may apply pressure to the printing medium passing through the fixing nip N. For example, the pressing roller 91 may be pressed toward the heating apparatus 93 by an elastic member (not illustrated).

The heating apparatus 93 may be rotated by a driving apparatus (not illustrated) in the image forming apparatus 1. In an example, a pressing belt instead of the pressing roller 91 may apply pressure to the printing medium passing through the fixing nip N. That is, as long as it is possible to apply the pressure to the printing medium passing through the fixing nip (N), the pressing roller 91 may be variously modified and implemented.

The heating apparatus 93 may apply heat to the printing medium passing through the fixing nip N. The heating apparatus 93 may include a fixing belt 95 in the form of a closed loop having flexibility, a nip forming frame 94 in contact with an inner side surface of the fixing belt 95, and a plurality of heaters 96 for heating the nip forming frame 94.

The fixing belt 95 may be formed to have a width equal to or wider than that of the printing medium. The fixing belt 95 hangs over the nip forming frame 94 with no tension. As the pressing roller 91 rotates, the fixing belt 95 may rotate by a frictional force between the pressing roller 91 and the fixing belt 95. Thereby, the printing medium passing through the transfer apparatus 60 may pass through the fixing nip N.

A jam prevention apparatus 100 may be disposed adjacent to the heating apparatus 93 so that a portion thereof may adjust a gap with the fixing belt 95. Accordingly, a wrap jam, in which the printing medium passing through the fixing nip N and is conveyed together with the fixing belt 95 in a state of being attached to a surface of the fixing belt 95 without being separated from the fixing belt 95, may be avoided or prevented.

In a case in which a jam occurs in which a tip of the printing medium passing through the fixing nip N is not separated from the fixing belt 95 and is folded (e.g., crumpled, wrinkled, etc.) between the jam prevention apparatus 100 and the fixing belt 95, when the printing medium is pulled in an opposite direction of the conveying direction of the printing medium to remove the printing medium, the jam prevention apparatus 100 may allow a gap with the fixing belt 95 to be elastically opened to prevent the fixing belt 95 from being pressed and deformed by the folded portion of the printing medium when the folded portion of the printing medium is pulled to exit between the jam prevention apparatus 100 and the fixing belt 95.

Hereinafter, an example of a jam prevention apparatus will be described with reference to the drawings.

Figure 2:
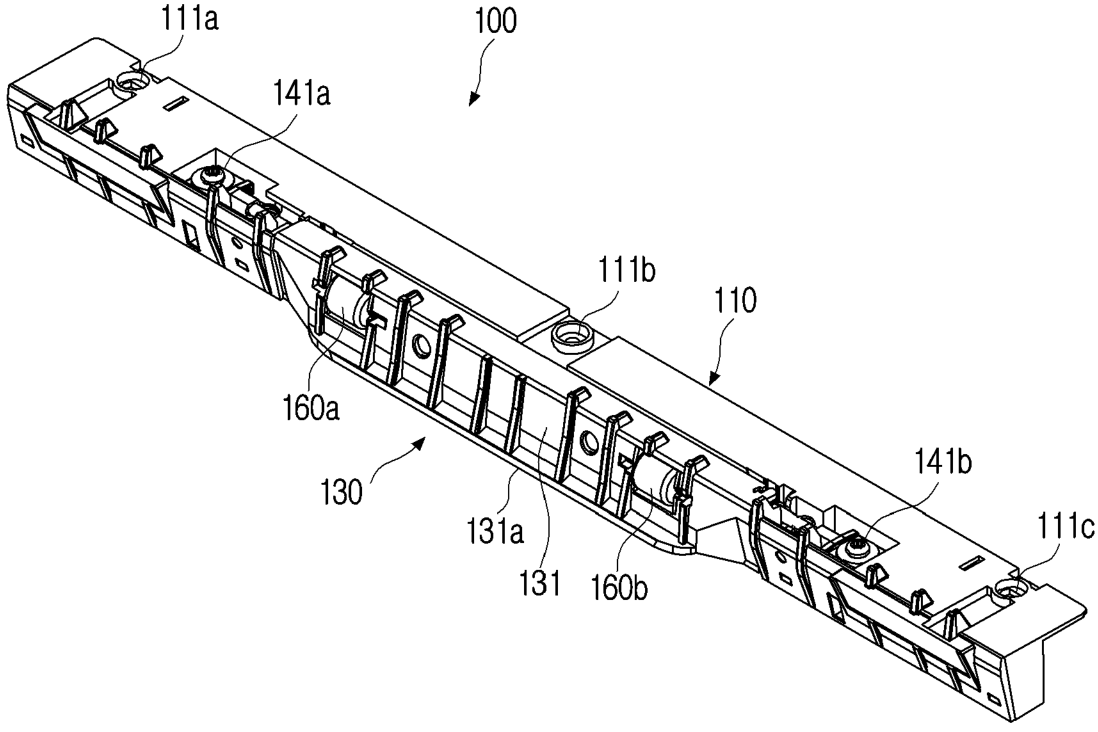
FIG. 2 is an assembled perspective view illustrating a jam prevention apparatus according to an example.
Figure 3:
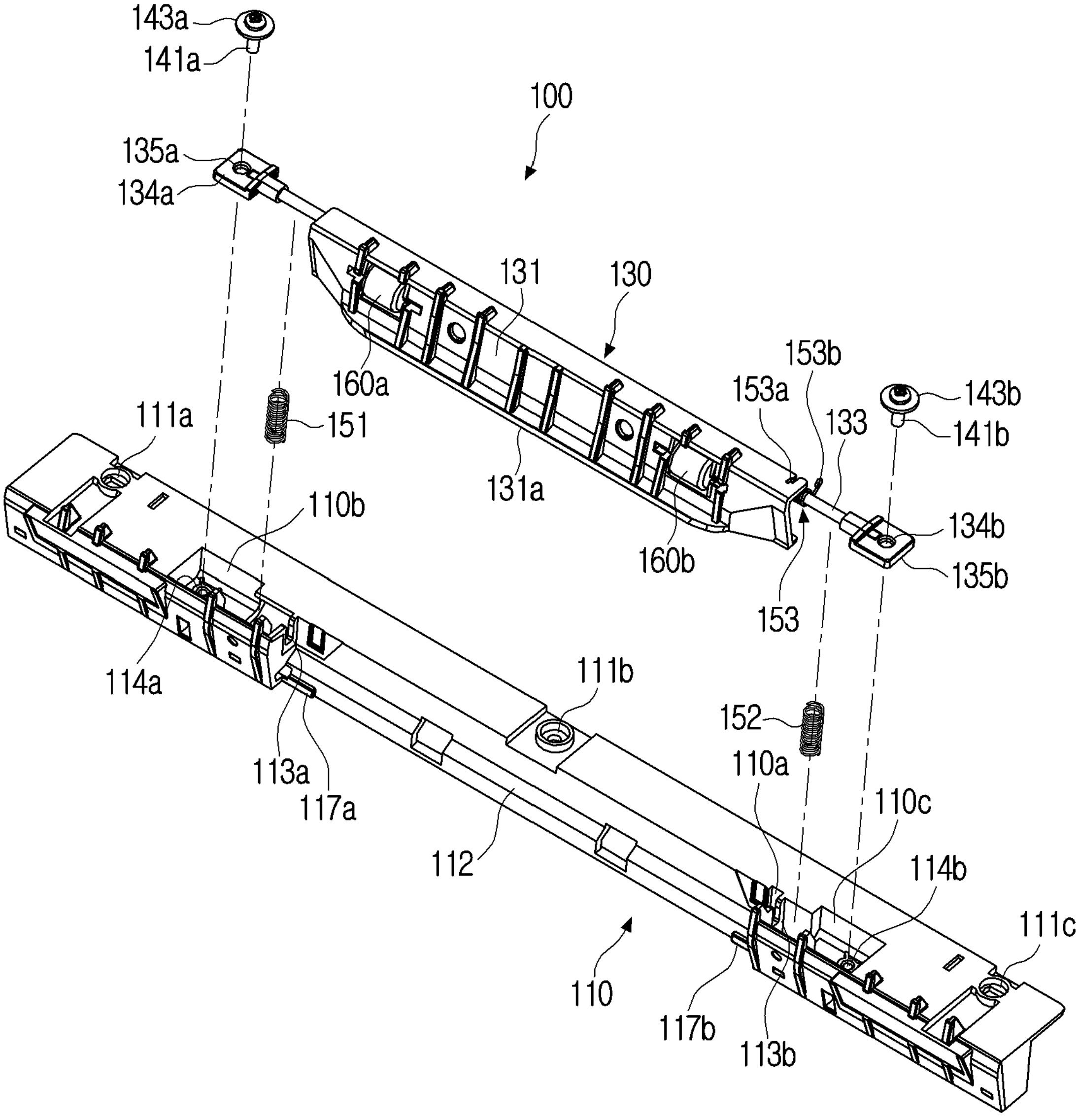
FIG. 3 is an exploded perspective view illustrating a jam prevention apparatus according to an example.
Figure 4:
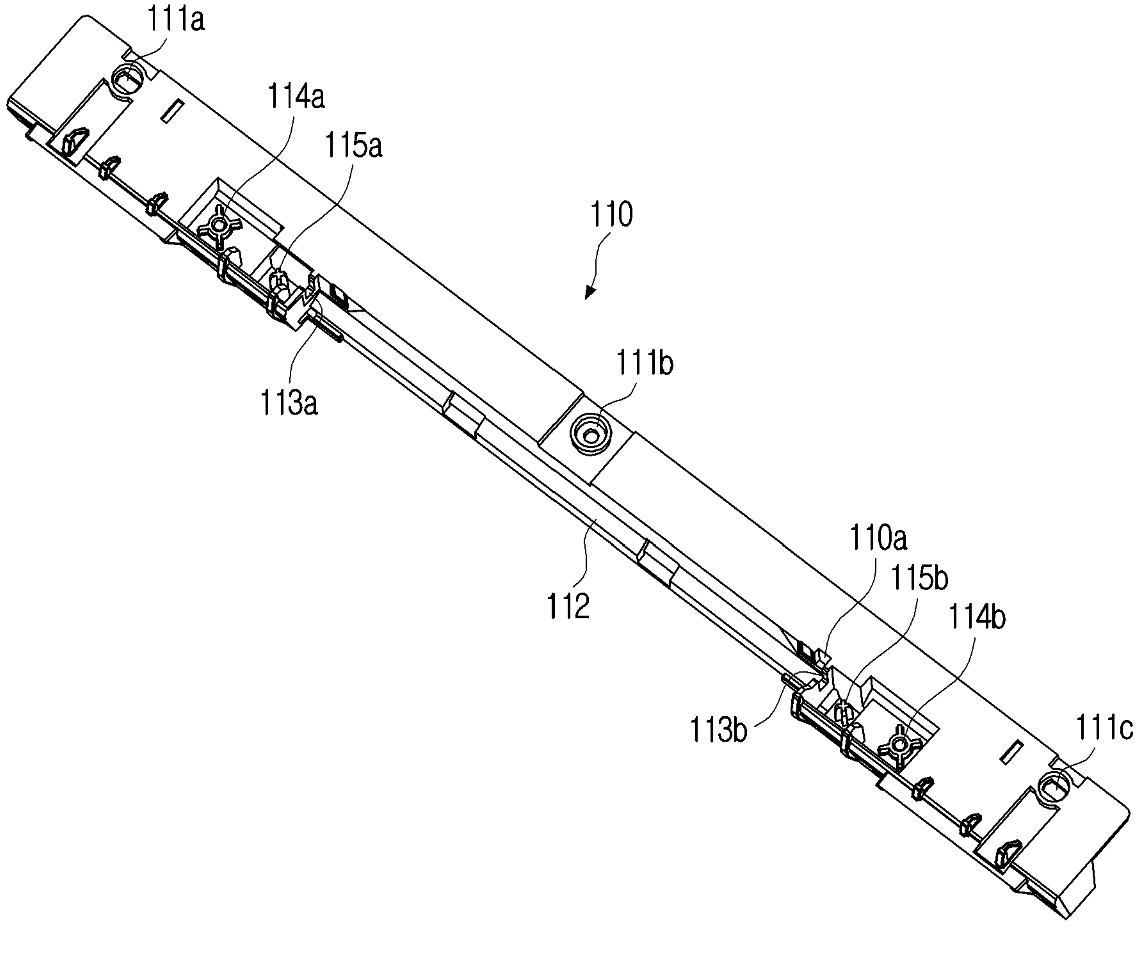
FIG. 4 is a perspective view illustrating a fixed frame of a jam prevention apparatus according to an example.
Figure 5:
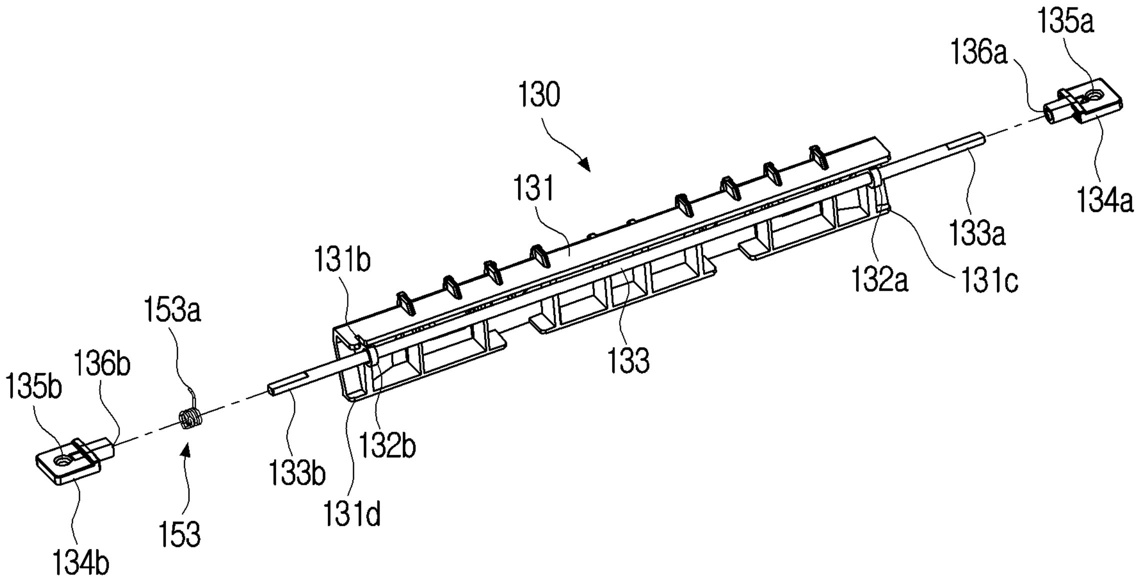
FIG. 5 is an exploded perspective view illustrating a movable apparatus of a jam prevention apparatus according to an example.

FIGS. 2 and 3 are an assembled perspective view and an exploded perspective view illustrating a jam prevention apparatus according to an example, FIG. 4 is a perspective view illustrating a fixed frame of a jam prevention apparatus according to an example, and FIG. 5 is an exploded perspective view illustrating a movable apparatus of a jam prevention apparatus according to an example.

Referring to FIGS. 2 and 3, the jam prevention apparatus 100 may include a fixed frame 110 to be fixed to a structure in the image forming apparatus 1 and disposed adjacent to the heating apparatus 93. The jam prevention apparatus 100 may also include a movable apparatus 130 movably connected to the fixed frame 110.

The fixed frame 110 may have a predetermined length and may be disposed substantially parallel to the heating apparatus 93 along a length direction of the heating apparatus 93.

The fixed frame 110 may be fixed to a structure in the image forming apparatus 1 by a plurality of fastening screws (not illustrated). To this end, in the fixed frame 110, a plurality of holes 111*a*, 111*b*, and 111*c* through which the plurality of fastening screws may respectively penetrate may be formed at intervals. In an example, the fixed frame 110 may be fixed to a structure in the image forming apparatus 1 by a fastening structure such as a snap fit coupling method as an alternative to or in addition to the plurality of fastening screws.

The fixed frame 110 may be provided with a mounting portion 112 having a groove shape in which the movable apparatus 130 is disposed on one side thereof. The mounting portion 112 may be formed having the groove shape smaller than the length of the fixed frame 110 along a length direction of the fixed frame 110.

On both sides of the mounting portion 112, first and second sliding grooves 113*a* and 113*b* may be formed to guide both ends of a hinge shaft 133 to linearly move with respect to the fixed frame 110.

Referring to FIG. 4, in the fixed frame 110, a first fixing protrusion 115*a* and a first fastening hole 114*a* may be sequentially formed on one side of the first sliding groove 113*a* in a direction away from the mounting portion 112.

One end of a first elastic member 151 that elastically supports the hinge shaft 133 with respect to the fixed frame 110 may be fixed to the first fixing protrusion 115*a*. A first adjusting screw 141*a* that adjusts a distance from which the hinge shaft 133 is spaced apart from the fixed frame 110 may be fastened to the first fastening hole 114*a*. As such, the distance from which the hinge shaft 133 is spaced apart from the fixed frame 110 may correspond to a gap between a portion of the movable apparatus 130 (i.e., an end 131*a* of a guide member 131) and the fixing belt 95.

In the fixed frame 110, a second fixing protrusion 115*b* and a second fastening hole 114*b* may be sequentially formed on one side of the second sliding groove 113*b* in the direction away from the mounting portion 112. In this case, the second fixing protrusion 115*b* may be disposed symmetrically with the first fixing protrusion 115*a* based on the mounting portion 112, and the second fastening hole 114*b* may be disposed symmetrically with the first fastening hole 114*a* based on the mounting portion 112.

One end of another first elastic member 152 that elastically supports the hinge shaft 133 with respect to the fixed frame 110 may be fixed to the second fixing protrusion 115*b*. A second adjusting screw 141*b* that adjusts a distance from which the hinge shaft 133 is spaced apart from the fixed frame 110 may be fastened to the second fastening hole 114*b*. As such, the distance from which the hinge shaft 133 is spaced apart from the fixed frame 110 may correspond to a gap between a portion of the movable apparatus 130 (i.e., the end 131*a* of the guide member 131) and the fixing belt 95.

In the fixed frame 110, a support groove 110*a* in which a second elastic member 153 is supported may be formed in a portion of the mounting portion 112 adjacent to the second sliding groove 113*b*. The second elastic member 153 may elastically support a portion of the movable apparatus 130 (i.e., the end 131*a* of the guide member 131) toward the fixing belt 95.

Referring to FIGS. 3 and 5, the movable apparatus 130 may include the guide member 131 disposed to be movable with respect to the fixed frame 110, the hinge shaft 133 which supports the guide member 131 to the fixed frame 110 to be movable, and first and second connection members 134*a* and 134*b* coupled to both ends of the hinge shaft 133 to connect the hinge shaft 133 and the fixed frame 110 to each other.

The guide member 131 may be disposed on the mounting portion 112 and may have a length that substantially corresponds to a length of the mounting portion 112 or is somewhat shorter than the length of the mounting portion 112. The guide member 131 is disposed adjacent to the fixing belt 95 such that the end 131*a* thereof maintains a predetermined gap with the fixing belt 95. In an example, the end 131*a* of the guide member 131 may extend in a length direction of the fixing belt 95.

The gap between the end 131*a* of the guide member 131 and the fixing belt 95 may be adjusted by rotating the first and second adjusting screws 141*a* and 141*b* in a fastening direction or a disengaging direction, which is a reverse direction thereto.

A processing tolerance may occur during fabrication of the jam prevention apparatus 100. In addition, when the jam prevention apparatus 100 is installed in the image forming apparatus 1, an installation tolerance may occur between the jam prevention apparatus 100 and various structures disposed around the jam prevention apparatus 100. Further, as the fixing belt 95 is formed with a thin thickness of a flexible material, a profile of the fixing belt may not be uniform due to an influence of variables (e.g., pressure tolerance, hardness of the pressing roller, tolerance of other components, etc.) during a forming process of the fixing belt 95. In an example jam prevention apparatus 100, as the gap between the end 131*a* of the guide member 131 and the fixing belt 95 can be adjusted through the first and second adjusting screws 141*a* and 141*b* even if the various tolerances described above exist, the printing medium passing through the fixing nip N may be effectively separated from the fixing belt 95, thereby preventing a wrap jam in advance.

The guide member 131 may be provided with a locking groove 131*b* through which a portion of the second elastic member 153 is mounted. The locking groove 131*b* may be disposed at a position approximately corresponding to the support groove 110*a* when the guide member 131 is disposed on the mounting portion 112.

In addition, in the guide member 131, a plurality of idle rollers 160*a* and 160*b* may be rotatably coupled to the guide member 131 above the end 131*a* thereof. The plurality of idle rollers 160*a* and 160*b* may guide the printing medium so that the printing medium passing through the fixing nip N may be provided to the conveying roller 11 adjacent to the jam prevention apparatus 100.

Referring to FIG. 5, the hinge shaft 133 may be coupled to penetrate first and second connecting protrusions 132*a* and 132*b* formed at both sides of a rear portion of the guide member 131, respectively. The first and second connecting protrusions 132*a* and 132*b* may be positioned in a substantially diagonal direction with respect to the end 131*a* of the guide member 131. The positions of the first and second connecting protrusions 132*a* and 132*b* may be positions formed by considering that the end 131*a* of the guide member 131 may be elastically supported in a direction toward the fixing belt 95 by the elastic force of the second elastic member 153.

The hinge shaft 133 has one end 133*a* inserted into a coupling groove 136*a* of the first support member 134*a* and the other end 133*b* inserted into a coupling groove 136*b* of the second support member 134*b*. In this case, both ends 133*a* and 133*b* of the hinge shaft 133 form a plane by cutting a portion of one main surface, respectively, so that cross sections of both ends 133*a* and 133*b* of the hinge shaft 133 are non-circular. In this case, each of the coupling grooves 136*a* and 136*b* may have a shape corresponding to the cross sections of both ends 133*a* and 133*b* of the hinge shaft 133. With such a coupling structure, the hinge shaft 133 is not rotated with respect to the first and second support members 134*a* and 134*b* when the hinge shaft 133 is inserted into the first and second support members 134*a* and 134*b*.

Referring to FIG. 3, the first support member 134*a* may be fixed to the fixed frame 110 by the first adjusting screw 141*a* which is screwed into the first fastening hole 114*a* of the fixed frame 110. In this case, a through hole 135*a* through which the first adjusting screw 141*a* penetrates may be formed in the first support member 134*a*.

The first support member 134*a* may be disposed in a first guide groove 110*b* formed to surround the first fastening hole 114*a* of the fixed frame 110 to move along an axial direction of the first adjusting screw 141*a*. In this case, in the first support member 134*a*, as an outer portion of the first support member 134*a* interferes with an inner surface of the first guide groove 110*b* in a circumferential direction of the axis of the first adjusting screw 141*a*, a rotation around the axis of the first adjusting screw 141*a* may be limited.

The second support member 134*b* may have the same fastening structure as the first support member 134*a* to perform the same role as the first support member 134*a* described above.

That is, the second support member 134*b* may be fixed to the fixed frame 110 by the second adjusting screw 141*b* which is screwed to the second fastening hole 114*b* of the fixed frame 110. In this case, a through hole 135*b* through which the second adjusting screw 141*b* penetrates may be formed in the second support member 134*b*.

The second support member 134*b* may be disposed in a second guide groove 110*c* formed to surround the second fastening hole 114*b* of the fixed frame 110 to move along an axial direction of the second adjusting screw 141*b* In this case, in the second support member 134*b*, as an outer portion of the second support member 134*b* interferes with an inner surface of the second guide groove 110*c* in a circumferential direction of the axis of the second adjusting screw 141*b*, a rotation around the axis of the second adjusting screw 141*b* may be limited.

The first adjusting screw 141*a* may be coupled to a washer 143*a* to widen a contact area with the first support member 134*a*. Like the first adjusting screw 141*a*, the second adjusting screw 141*b* may be coupled to a second washer 143*b* to widen a contact area with the second support member 134*b*.

Because the hinge shaft 133 is elastically supported in the direction away from the fixed frame 110 by a pair of first elastic members 151 and 152, when the first and second adjusting screws 141*a* and 141*b* are rotated in the fastening direction or the disengaging direction, which is the reverse direction thereto, respectively, the first and second support members 134*a* and 134*b* move along the axial direction of the first and second adjusting screws 141*a* and 141*b*, respectively, so that the distance from the first and second fastening holes 114*a* and 114*b* of the fixed frame 110 may be changed. For example, when the first and second adjusting screws 141*a* and 141*b* are rotated in the fastening direction, the positions of the first and second support members 134*a* and 134*b* may be changed in a direction toward the first and second fastening holes 114*a* and 114*b* of the fixed frame 110. In addition, when the first and second adjusting screws 141*a* and 141*b* are rotated in the disengaging direction, the positions of the first and second support members 134*a* and 134*b* may be changed in a direction away from the first and second fastening holes 114*a* and 114*b* of the fixed frame 110.

In this way, when the positions of the first and second support members 134*a* and 134*b* are changed, the guide member 131 indirectly connected to the first and second support members 134*a* and 134*b* through the hinge shaft 133 may move together with the first and second support members 134*a* and 134*b* to change a position thereof. Therefore, the gap between the end 131*a* of the guide member 131 and the fixing belt 95 may be adjusted to narrow or widen according to the rotation direction of the first and second adjusting screws 141*a* and 141*b*.

One end of the first elastic member 151 is fixed by the first fixing protrusion 115*a* of the fixed frame 110, and the other end thereof is elastically supported on one side of the hinge shaft 133. One end of the other first elastic member 152 is fixed by the second fixing protrusion 115*b* of the fixed frame 110 and the other end thereof is elastically supported on the other side of the hinge shaft 133. Accordingly, the guide member 131 rotatably connected to the hinge shaft 133 may be elastically supported in a direction spaced apart from the fixed frame 110 by the pair of first elastic members 151 and 152.

The pair of first elastic members 151 and 152 may be positioned at the same or approximately similar points from the central point of the hinge axis 133 toward both ends of the hinge shaft 133 to elastically support the hinge shaft 133. Accordingly, the elastic force acting on the guide member 131 by the pair of first elastic members 151 and 152 may operate substantially uniformly without being eccentric to either side of the guide member 131. When adjusting the gap between the end 131*a* of the guide member 131 and the fixing belt 95 by rotating the first and second adjusting screws 141*a* and 141*b* in the fastening direction or the disengaging direction, the guide member 131 can stably maintain the position after being adjusted because the elastic force is applied to the guide member 131.

In the disclosure, the first elastic members 151 and 152 are provided as a pair as an example. However, the disclosure is not limited thereto, and one or more pairs of the first elastic members may be applied. For example, it is also possible to dispose a pair of first elastic members on one side of the hinge shaft 133, and to dispose a pair of first elastic members on the other side of the hinge shaft 133. In this case, the number of first elastic members elastically supporting one side and the other side of the hinge shaft 133, respectively, may be equal to each other so that the elastic force acting on the hinge shaft 133 may act uniformly.

The pair of first elastic members 151 and 152 may include a coil spring capable of applying the elastic force in a linear direction.

The second elastic member 153 may be disposed between the fixed frame 110 and the guide member 131 in a state of being fitted to the hinge shaft 133. The second elastic member 153 may have one side 153*a* which is supported while being inserted into the locking groove 131*b* of the guide member 131, and the other side 153*b* which is supported while being inserted into the support groove 110*a* of the fixed frame 110.

The guide member 131 may be elastically supported by the second elastic member 153 so as to rotate about the hinge shaft 133. Accordingly, the end 131*a* of the guide member 131 may be elastically supported in a direction toward the fixing belt 95 by the elastic force of the second elastic member 153. At this time, both lower ends 131*c* and 131*d* of the rear portion interfere with a pair of seating protrusions 117*a* and 117*b* protruding from both lower ends of the mounting portion 112 by the elastic force of the second elastic member 153, such that the guide member 131 no longer rotates.

In the disclosure, one second elastic member 153 is described as being disposed at a portion adjacent to the other end 133*b* of the hinge shaft 133, but is not limited thereto, and it is also possible to dispose another second elastic member at the portion adjacent to one end 133*a* of the hinge shaft 133.

The second elastic member 153 may include a torsion spring capable of applying the elastic force in the rotation direction.

An example operation for adjusting a gap of a jam prevention apparatus will be described with reference to FIGS. 6 and 7.

Figure 6:
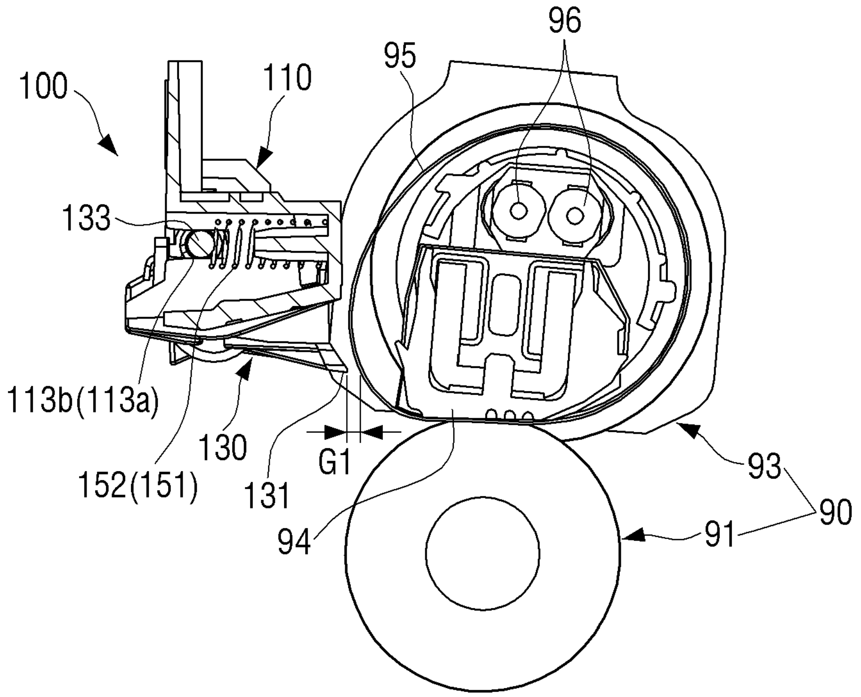
FIGS. 6 and 7 are schematic views illustrating adjustment of a gap between a movable apparatus of a jam prevention apparatus and a fixing belt to different states according to an example.
Figure 7:
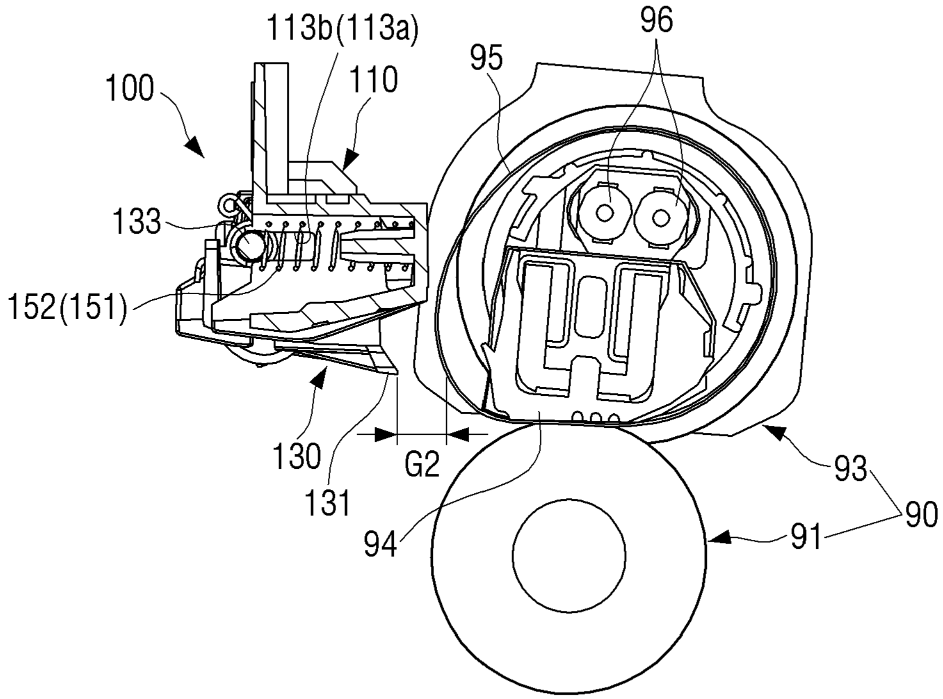

FIGS. 6 and 7 are schematic views illustrating adjustment of a gap between a movable apparatus of a jam prevention apparatus and a fixing belt to different states according to an example.

Referring to FIGS. 6 and 7, when a gap between the end 131*a* of the guide member 131 and the fixing belt 95 of the fixing apparatus 90 is not set correctly due to a processing tolerance that may occur when manufacturing the components that make up the fixing apparatus 90, an assembly tolerance that may occur when the fixing apparatus 90 is installed inside the image forming apparatus 1, an assembly tolerance that may occur when the jam prevention apparatus 100 is installed around the fixing apparatus 90, and the like, a wrap jam may occur in which the printing medium moves together with the fixing belt 95 in the rotation direction of the fixing belt 95 in a state of being attached to a surface of the fixing belt 95 after passing through the fixing nip N by the heat and pressure applied while the printing medium P passes through the fixing nip N.

The gap between the end 131*a* of the guide member 131 and the fixing belt 95 may be measured in real time through equipment such as, for example, a vision jig. Here, the vision jig may be a vision inspector capable of measuring a posture of a subject or a distance between a plurality of subjects by irradiating a laser beam onto the subject.

An example jam prevention apparatus 100 may adjust the gap between the end 131*a* of the guide member 131 and the fixing belt 95 so that the printing medium P may be separated from the fixing belt 95 at an intended position by changing the position of the movable apparatus 130 while checking the measured gap information.

For example, in a case in which the gap between the end 131*a* of the guide member 131 and the fixing belt 95 is narrowed, if the first and second adjusting screws 141*a* and 141*b* are rotated in the fastening direction, the end 131*a* of the guide member 131 moves in the direction toward the fixing belt 95 as illustrated in FIG. 6, so that a gap G1 between the end 131*a* of the guide member 131 and the fixing belt 95 may be set to be gradually narrowed.

On the contrary, in a case in which the gap between the end 131*a* of the guide member 131 and the fixing belt 95 is widened, if the first and second adjusting screws 141*a* and 141*b* are rotated in the disengaging direction, the end 131*a* of the guide member 131 moves in a direction away from the fixing belt 95 as illustrated in FIG. 7, so that a gap G2 between the end 131*a* of the guide member 131 and the fixing belt 95 may be set to be gradually widened.

As such, an example jam prevention apparatus 100 may adjust an appropriate gap between the end 131*a* of the guide member 131 and the fixing belt 95 by rotating the first and second adjusting screws 141*a* and 141*b* in the fastening direction or the disengaging direction.

As such, by providing a gap-adjustable structure between the end 131*a* of the guide member 131 and the fixing belt 95, it is possible to address various tolerances that may exist in the image forming apparatus 1 described above and to reduce or prevent occurrence of the wrap jam.

Figure 8:
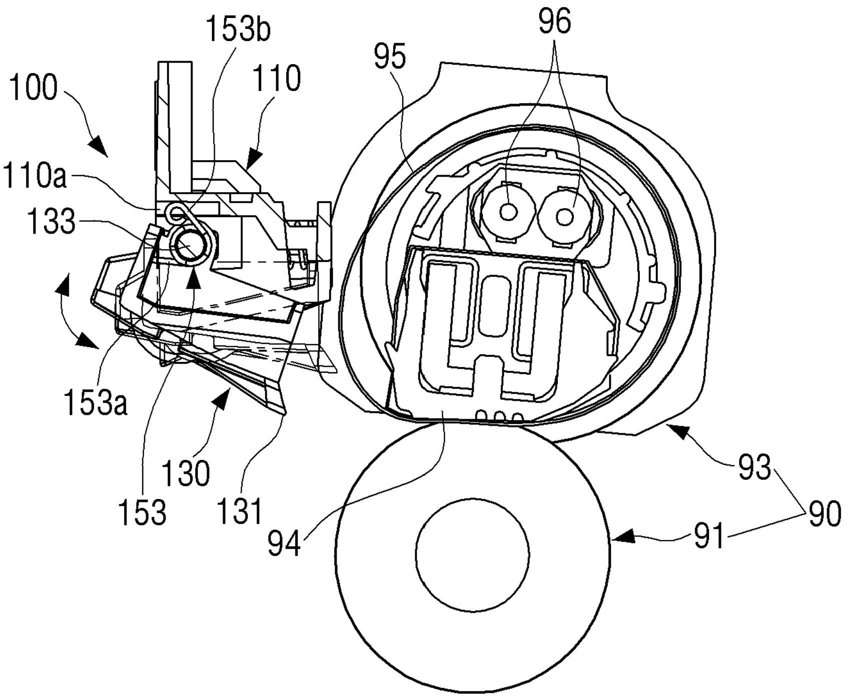
FIG. 8 is a schematic view illustrating a state in which a movable apparatus of a jam prevention apparatus is rotatable with respect to a fixed frame according to an example.

FIG. 8 is a schematic view illustrating a state in which a movable apparatus of a jam prevention apparatus is rotatable with respect to a fixed frame according to an example.

Referring to FIG. 8, in addition to the wrap jam described above, a jam may occur in which a tip of the printing medium is folded (e.g., wrinkled, crumpled, etc.) after the printing medium is drawn between the guide member 131 and the fixing belt 95.

In a case in which such a jam occurs, if the printing medium is pulled in a direction opposite to the conveying direction of the printing medium to remove the printing medium, the folded portion of the printing medium is forcibly drawn out between the guide member 131 and the fixing belt 95.

At this time, the guide member 131 elastically supported by the second elastic member 153 is rotated in a clockwise direction about the hinge shaft 133 as illustrated in FIG. 8 by the folded portion of the printing medium to widen the gap between the guide member 131 and the fixing belt 95.

Accordingly, the folded portion of the printing medium may be drawn out through the gap widened by the rotation of the guide member 131. At this time, because the pressure applied to the fixing belt 95 by the folded portion of the printing medium drawn out through the gap is reduced, it is possible to avoid or prevent the fixing belt 95 from being deformed or broken by the pressure.

Although examples of the disclosure have been illustrated and described hereinabove, the disclosure is not limited thereto, and may be variously modified and altered by those skilled in the art to which the disclosure pertains without departing from the spirit and scope of the disclosure claimed in the claims. These modifications and alterations are to fall within the scope of the disclosure.

What is claimed is:

1. A jam prevention apparatus comprising:
- a fixed frame; and
- a movable apparatus to be connected to the fixed frame to adjust a gap with a fixing belt via a pair of support members connected between a hinge shaft and a guide member, wherein the pair of support members are disposed along a sliding groove of the fixed frame, and wherein the sliding groove is configured to guide the hinge shaft to move linearly with respect to the fixed frame.

2. The jam prevention apparatus as claimed in claim 1,
- wherein the movable apparatus is detachably fastened to the fixed frame through a plurality of adjusting screws, and
- wherein the gap with the fixing belt is adjusted according to a fastening direction of the adjusting screws.

3. The jam prevention apparatus as claimed in claim 2, wherein the movable apparatus includes:
- the pair of support members connected to the fixed frame by the plurality of adjusting screws;
- the hinge shaft having both ends rotatably connected to the pair of support members, respectively, and elastically supported on the fixed frame; and
- the guide member rotatably connected to the hinge shaft and elastically supported on the fixed frame.

4. The jam prevention apparatus as claimed in claim 3, wherein a separation distance of the pair of support members from the fixed frame is adjusted according to a rotation direction of the plurality of adjusting screws.

5. The jam prevention apparatus as claimed in claim 4, wherein the hinge shaft is to move together with the pair of support members.

6. The jam prevention apparatus as claimed in claim 3, wherein the hinge shaft is elastically supported by a pair of first elastic members disposed between the fixed frame and the hinge shaft.

7. The jam prevention apparatus as claimed in claim 6, wherein the pair of first elastic members includes a coil spring.

8. The jam prevention apparatus as claimed in claim 3, wherein the guide member is elastically supported on the fixed frame by a second elastic member coupled to the hinge shaft.

9. The jam prevention apparatus as claimed in claim 8, wherein the guide member is elastically supported in a direction toward which an end of the guide member faces the fixing belt by the second elastic member.

10. The jam prevention apparatus as claimed in claim 8, wherein the second elastic member includes a torsion spring.

11. The jam prevention apparatus as claimed in claim 3, wherein an end of the guide member extends in a length direction of the fixing belt.

12. The jam prevention apparatus as claimed in claim 3, wherein one surface of the guide member is rotatably coupled to a guide roller for guiding a printing medium conveyed by the fixing belt.

13. An image forming apparatus comprising:
- a main body;
- a printing engine to be disposed in the main body and to form an image on a printing medium;
- a fixing apparatus including a fixing roller and a fixing belt disposed to face the fixing roller; and
- a jam prevention apparatus including a fixed frame disposed adjacent to the fixing apparatus, and a movable apparatus to be detachably fastened to the fixed frame through a plurality of adjusting screws and to adjust a gap with the fixing belt via a pair of support members connected between a hinge shaft and a guide member, wherein the pair of support members are disposed along a sliding groove of the fixed frame, and wherein the sliding groove is configured to guide the hinge shaft to move linearly with respect to the fixed frame, and according to a fastening direction of the plurality of adjusting screws.

14. The image forming apparatus as claimed in claim 13, wherein the jam prevention apparatus further includes:
- the pair of support members connected to the fixed frame by the plurality of adjusting screws;
- the hinge shaft having both ends rotatably connected to the pair of support members, respectively, and elastically supported on the fixed frame; and
- the guide member rotatably connected to the hinge shaft and elastically supported on the fixed frame.

15. The image forming apparatus as claimed in claim 14,
- wherein the hinge shaft is elastically supported by a pair of first elastic members disposed between the fixed frame and the hinge shaft, and
- wherein the guide member is elastically supported on the fixed frame in a direction toward which an end of the guide member faces the fixing belt by a second elastic member coupled to the hinge shaft.

* * * * *